(12) United States Patent  
Quijano et al.

(10) Patent No.: US 9,440,595 B2  
(45) Date of Patent: Sep. 13, 2016

(54) INSTRUMENT PANEL SUBSTRATE WITH PIN POSITIONING PATTERN FOR CORRECT PLACEMENT OF MULTIPLE ECU ATTACHMENTS

(71) Applicant: Toyota Motor Engineering & Manufacturing North America, Inc., Erlanger, KY (US)

(72) Inventors: Jonathan Joseph Quijano, Ann Arbor, MI (US); Samuel L. Sowles, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 14/575,234

(22) Filed: Dec. 18, 2014

(65) Prior Publication Data

US 2016/0176355 A1    Jun. 23, 2016

(51) Int. Cl.
*B62D 25/14*     (2006.01)
*B60R 11/02*     (2006.01)
*B60R 11/00*     (2006.01)

(52) U.S. Cl.
CPC ........ *B60R 11/02* (2013.01); *B60R 2011/0005* (2013.01); *B60R 2011/0052* (2013.01)

(58) Field of Classification Search
CPC ............. B60R 11/02; B60R 2011/005; B60R 2011/0052
See application file for complete search history.

(56) References Cited

U.S. PATENT DOCUMENTS

| | | | |
|---|---|---|---|
| 5,324,203 A | 6/1994 | Sano et al. | |
| 5,685,598 A | 11/1997 | Inoue et al. | |
| 8,096,576 B2 | 1/2012 | Azuma | |
| 8,830,686 B2 | 9/2014 | Nomoto | |
| 2010/0199468 A1 | 8/2010 | Matsui et al. | |
| 2011/0084169 A1* | 4/2011 | Menne | B64C 1/10 244/129.1 |

\* cited by examiner

*Primary Examiner* — Lori L Lyjak
(74) *Attorney, Agent, or Firm* — Dinsmore & Shohl LLP

(57) ABSTRACT

A panel-ECU bracket attachment system that prevents the placement of an ECU at an incorrect location within a motor vehicle. The panel-ECU bracket attachment system includes a panel, e.g. an instrument panel, with a first ECU bracket attachment site and a second ECU bracket attachment site. The first ECU bracket attachment site has a first pair of alignment pins spaced apart by a first distance therebetween and the second ECU bracket attachment site has a second pair of alignment pins spaced apart by a second distance therebetween. The second distance is not equal to the first distance. The instrument panel-ECU bracket attachment system also includes a first ECU bracket with a first pair of pin apertures that are spaced apart from each other by the first distance and a second ECU bracket with a second pair of pin apertures that are spaced apart from each other by the second distance.

20 Claims, 4 Drawing Sheets

INSTRUMENT PANEL SUBSTRATE WITH PIN POSITIONING PATTERN FOR CORRECT PLACEMENT OF MULTIPLE ECU ATTACHMENTS

FIELD OF THE INVENTION

The present invention is related to a panel for a motor vehicle, and in particular, to a panel-ECU bracket attachment system that affords for unique attachment locations for multiple ECU brackets and ECUs.

BACKGROUND OF THE INVENTION

The increased use of engine control units (ECUs) in motor vehicles is known. Such ECUs are used to control various systems or components of the motor vehicle such as a sound system for the vehicle, a seat positioning system, an interior environment control system, and the like. With the increase in the number of ECUs used in motor vehicles, their placement and location within a vehicle during the assembly line manufacturing process can be a matter of concern. Stated differently, assembly line manufacturing requires workers on the assembly line to attach components, parts, etc. at their correct location within a limited amount of time. In addition, placing a particular ECU at a wrong location during assembly of the motor vehicle leads to increased labor and costs to correct such a mistake.

Currently, ECUs are placed relatively far distances from each in order to ensure proper location within the vehicle. Stated differently, ECUs are typically attached to a structure of the vehicle, e.g. an instrument panel, at relatively large distances from each other in order to prevent attachment of a given ECU at an incorrect location. However, it can be desirable to attach two or more ECUs relatively close to each other. Therefore, a panel that has an improved ECU attachment structure would be desirable.

SUMMARY OF THE INVENTION

A panel-ECU bracket attachment system that prevents the misplacement of an ECU at a wrong location within a motor vehicle is provided. The panel-ECU bracket attachment system includes a panel that has a first ECU bracket attachment site and a second ECU bracket attachment site. The first ECU bracket attachment site has a first pair of alignment pins and the first pair of alignment pins are spaced apart by a first distance therebetween. The second ECU bracket attachment site has a second pair of alignment pins and the second pair of locations pins are spaced apart by a second distance therebetween. The second distance is not equal to the first distance and thereby prevents ECU bracket misplacement. In some instances, the panel is an instrument panel (IP) and the panel-ECU bracket attachment system is an IP-ECU bracket attachment system.

The panel-ECU bracket attachment system also includes a first ECU bracket and a second ECU bracket. The first ECU bracket has a first pair of pin apertures that are spaced apart from each other by the first distance and the second ECU bracket has a second pair of pin apertures that are spaced apart from each other by the second distance. As such, the first ECU bracket is attachable to the panel only at the first ECU bracket attachment site and the second ECU bracket is attachable to the panel only at the second ECU bracket attachment site.

The first and second ECU brackets have a first and second panel attachment portion, respectively, the first and second pair of pin apertures being within the respective panel attachment portion. In addition, the first and second panel attachment portions have a first and second generally planar portion, respectively. The first and second generally planar portions each a have complementary contoured puzzle-shaped inner edge. The complementary contoured puzzle-shaped inner edges of the first and second panel attachment portions extend generally parallel to each other when the first and second ECU brackets are attached to the panel.

It is appreciated that the panel-ECU attachment system disclosed herein also ensures proper orientation of a single ECU. For example, a typical ECU has a plug for a wire harness to connect and the panel-ECU attachment system ensures that the ECU is always properly oriented with respect to a design intent, i.e. the ECU is not flipped or reversed. Attaching an ECU in an incorrect orientation can cause issues related to space constraints, ECU function, and connecting of the wire harness, e.g. a wire harness length may not be long enough or may be difficult for an assembly member to access the ECU connection.

Instances where a single ECU is installed instead of two or more ECUs occur when a given vehicle model has more than one version or "grade", e.g. a high content grade ("Limited Grade") and a low content grade ("Base Grade"). Typically, the Limited Grade vehicle has more features and thus more ECUs than the Base Grade. Therefore, the Base Grade vehicle has fewer ECUs installed than a given quantity of attachment provisions and the panel-ECU attachment system prevents misplacement and/or misorientation of a single ECU during installation.

In some instances, the complementary contoured puzzle-shaped inner edges are spaced apart from each other not more than 2 centimeters. In other instances, the complementary contoured puzzle-shaped inner edges are spaced apart from each other not more than 1 centimeter. In still yet another instance, the complementary contoured puzzle-shaped inner edges are spaced apart from each other not more than 0.5 centimeter. Also, the first and second ECU brackets can be attached to the panel using any attachment mechanism or method known to those skilled in the art, illustratively including the use of a threaded fastener, an adhesive, a clip, a weld, etc.

DETAILED DESCRIPTION OF THE INVENTION

A panel-ECU bracket attachment system is provided that prevents the attachment of an ECU bracket at a wrong or incorrect location within a motor vehicle. Stated differently, the panel-ECU bracket attachment system includes a panel with a unique pin configuration that only allows a unique ECU bracket to be attached at a given attachment site. In some instances, the panel is an instrument panel (IP) and the panel-ECU bracket attachment system is an IP-ECU bracket attachment system.

The panel-ECU bracket attachment system includes a panel, e.g. an IP that has a back side. The back side has at least two ECU bracket attachment sites and each ECU bracket site has a pair of ECU bracket alignment pins. Each pair of ECU bracket alignment pins are spaced apart from each other by a different pin-to-pin distance than every other pair of ECU bracket alignment pins. As such, each ECU bracket attachment site has a unique alignment pin spatial configuration and thereby prevents ECU bracket misplacement.

The panel-ECU bracket attachment system also includes at least two ECU brackets that have an ECU attachment portion and a panel attachment portion. Each panel attachment portion has a pair of alignment pin apertures that are spaced apart from each other by different aperture-to-aperture distance than every other pair of ECU bracket alignment pin apertures. As such, each panel attachment portion has a unique alignment pin aperture spatial configuration that is complementary with one of the alignment pin spatial configurations on the back side of the panel. In this manner, each of the ECU brackets is ensured to attach to the panel back side at only one of the ECU bracket attachment sites.

Figure 1:
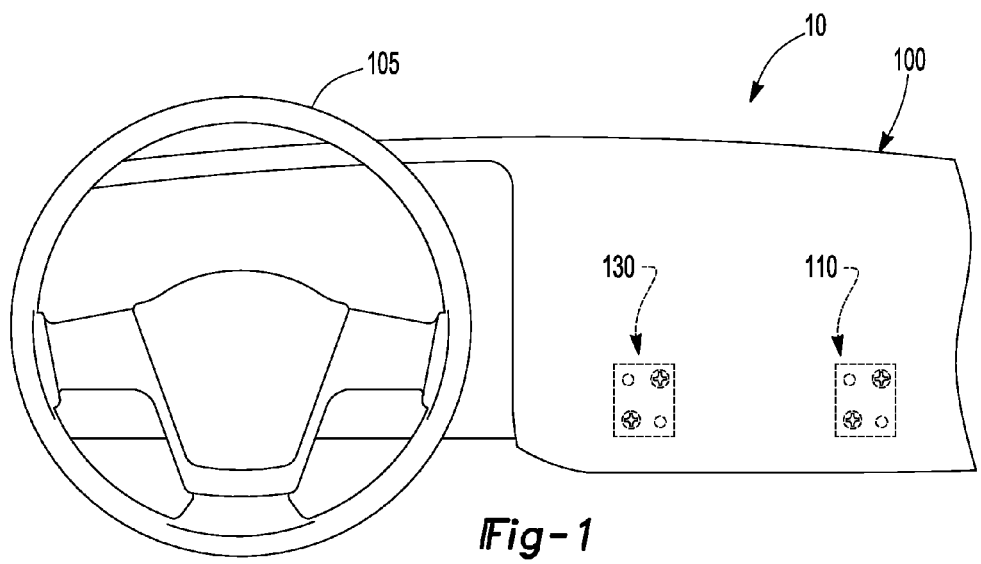
FIG. 1 is a prior art view of a panel with a pair of ECU bracket attachment sites.
Figure 2:
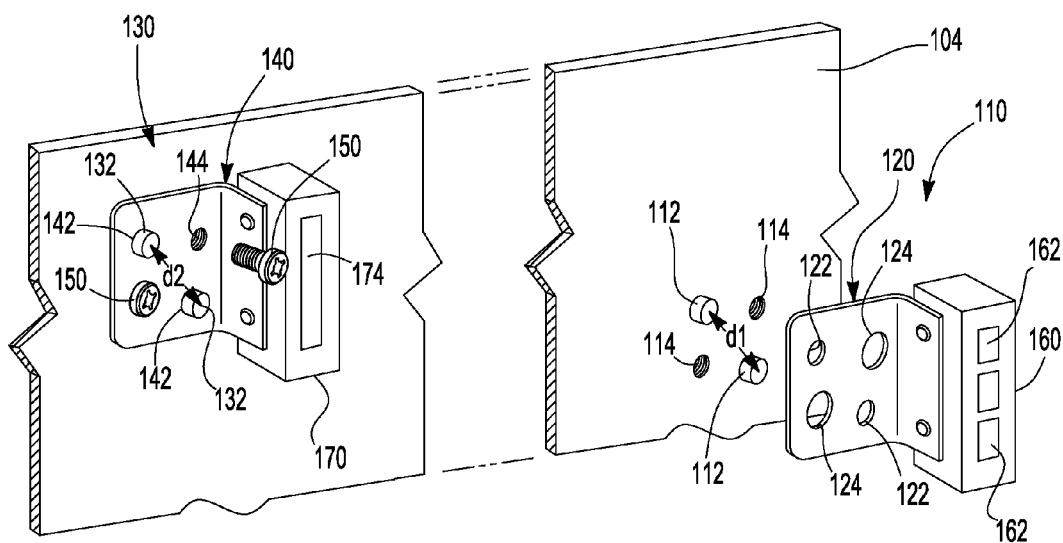
FIG. 2 is a prior art view of a pair of ECU brackets attached to a back side of the panel shown in FIG. 1.

A prior art view of a panel 100 in the form of an IP and a pair of ECU bracket attachment sites is shown generally at reference numeral 10 in FIG. 1. The prior art embodiment 10 includes the panel 100 with a first ECU bracket attachment site 110 and a second ECU bracket attachment site 130. A steering wheel 105 is also shown in FIG. 1. FIG. 2 illustrates a more detailed view of the attachment sites shown in FIG. 1. In particular, the panel 100 has a back side 104 and the first ECU bracket attachment site 110 has a pair of ECU bracket alignment pins 112 and a pair of threaded apertures 114. An ECU bracket 120 is also shown, the ECU bracket 120 having an ECU 160 with one or more electrical connection slots or plugs 162 attached thereto. The ECU bracket has a pair of pin apertures 122 and a pair of fastener apertures 124. The pair of alignment pins 112 are spaced apart from each other by a distance d1. It is appreciated that the pin apertures 122 are also spaced apart from each other by the distance d1 such that the ECU bracket 120 can fit over the alignment pins 112.

Similar to the first ECU bracket attachment site 110, the second ECU bracket attachment site 130 includes a pair of alignment pins 132 and a pair of threaded apertures 144. The site also includes a second ECU bracket 140 with an ECU 170 with one or more electrical connection slots or plugs 174 attached thereto. The pair of alignment pins 132 are spaced apart from each other by a distance d2 as are a pair of pin apertures 142 of the ECU bracket 140. Also, the distance d1 is equal to the distance d2 (d1=d2). As such, the ECU bracket 120 with the ECU 160 attached thereto can be mistakenly attached to the back side 104 of the panel 100 at the second ECU bracket attachment site 130.

Also shown in the figure is a pair of threaded fasteners 150 which can be inserted through the fastener apertures 124 and/or fastener apertures 144 and used to attach the ECU brackets to the panel 100. It is appreciated that the first and second ECU bracket attachment sites 110 and 130 are spaced relatively large distances apart from each other on the panel 100.

Figure 3:
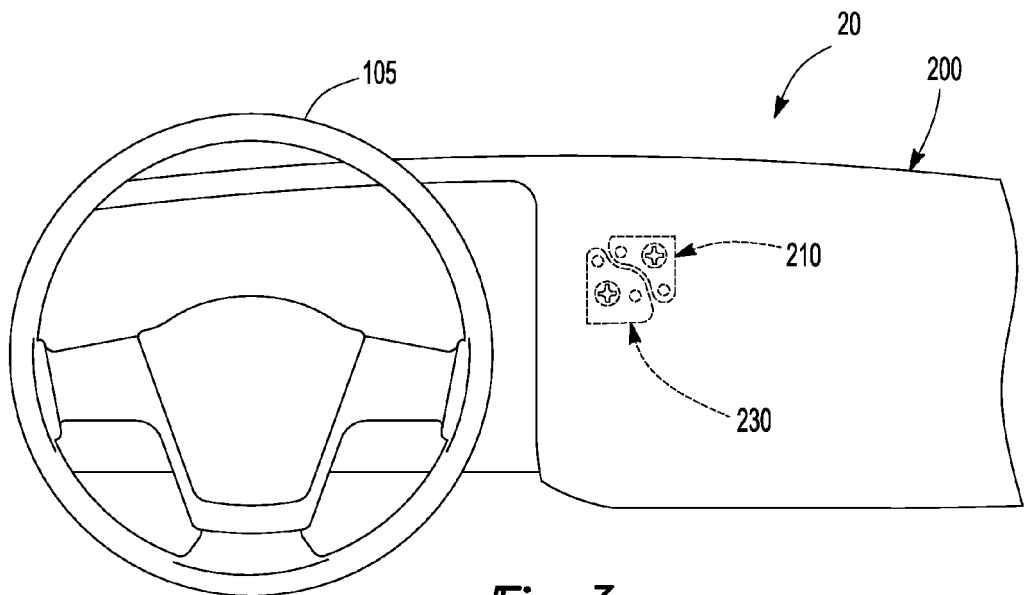
FIG. 3 is a schematic illustration of a pair of ECU brackets attached to a back side of a panel according to an embodiment disclosed herein.
Figure 4:
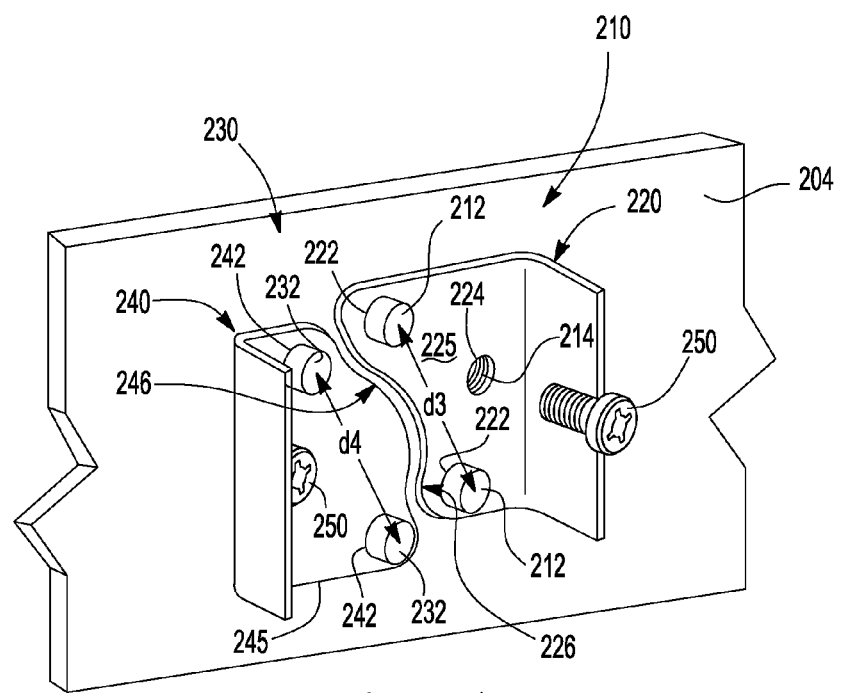
FIG. 4 is a schematic illustration of the pair of ECU brackets shown in FIG. 3.

Turning now to FIGS. 3 and 4, an inventive panel-ECU bracket attachment system is shown generally at reference numeral 20. The embodiment 20 includes a panel 200 illustrated as an IP. The panel 200 has a first ECU bracket attachment site 210 and a second ECU bracket attachment site 230. In addition, the panel 200 has a back side 204 as specifically shown in FIG. 4.

The first ECU bracket attachment site 210 has a pair of alignment pins 212 and a single threaded aperture 214 that is complementary with a threaded fastener 250 as is known to those skilled in the art. The second ECU bracket attachment site 230 has a pair of alignment pins 232 and a single threaded aperture (not shown). However, the distance between the pair of alignment pins 212 d3 is not the same equal to the distance between the pair of alignment pins 232 d4 (d3≠d4).

The first ECU bracket attachment site also includes a first ECU bracket 220 that has a pair of alignment pin apertures 222 spaced apart from each other by the distance d3 and a single fastener aperture 224. A second ECU bracket 240 has a pair of alignment pin apertures 242 that are spaced apart from each other by the distance d4 and a fastener aperture (not shown). With the distance between the pair of alignment pin apertures 222 being d3 and the distance between the pair of alignment pin apertures 244 being d4, and d3 not being equal to d4, the first ECU bracket 220 can only be attached to the back side 204 of the panel 200 at the first ECU bracket attachment site 210. Likewise, the second ECU bracket 240 can only be attached to the back side 204 at the second ECU bracket attachment site 230. In this manner, the attachment of an ECU bracket and thus an ECU at an undesired location within a motor vehicle is prevented. Furthermore, since attaching one or more ECU brackets at wrong locations within a motor vehicle is prevented as disclosed herein, the possibility of placing two or more ECUs closer to each other is provided.

The ECU brackets can also include another feature that provides for accurate positioning and location. In particular, the first ECU bracket 220 has a first IP attachment portion 225 and the second ECU bracket 240 has a second IP attachment portion 245. The first and second IP attachment portions 225, 245 can be generally planar and each has a complementary contoured puzzle-shaped inner edge 226 and 246, respectively. As shown in FIG. 4, the pair of complementary contoured puzzle-shaped inner edges 226 and 246 allow for the first and second ECU brackets 220 and 240, respectively, to be fit together like a pair of puzzle pieces and thereby ensure that the brackets are properly attached and located with respect to each other. Also shown in FIG. 4, the pair of complementary contoured puzzle-shaped inner edges can extend generally parallel to each other. Stated differently, the contoured puzzle-shaped inner edge 226 is spaced apart from the contoured puzzle-shaped inner edge 246 a constant distance along its length. In some instances, the pair of complementary contoured puzzle-shaped inner edges 226 and 246 are parallel and spaced apart from each other not more than 2 centimeters, preferably parallel and spaced apart from each other not more than 1 centimeter, and still more preferably parallel and spaced apart from each other not more than 0.5 centimeters.

Figure 5:
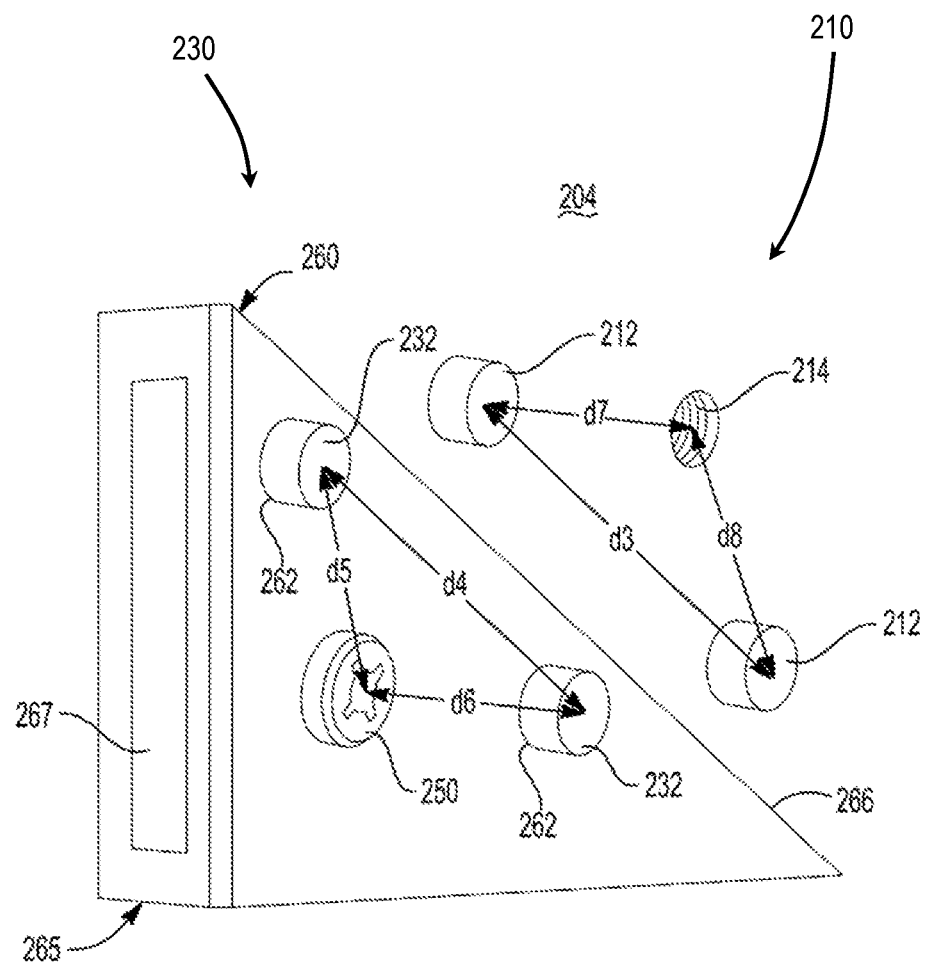
FIG. 5 is a schematic illustration of a single ECU bracket attached to a back side of a panel according to an embodiment disclosed herein.

FIG. 5 illustrates a panel-ECU attachment system with only one ECU bracket 260 having a pair of alignment pin apertures 262. As shown in the figure, the distances between the alignment pins 212 and single threaded aperture 214 (d3, d7, d8) and the distances between the alignment pins 232 and single threaded aperture 234 (not shown) are such that the ECU bracket can only be attached at the ECU attachment site 230, e.g. using threaded fastener 250. Furthermore, the ECU bracket 260 can only be attached in a correction orientation, i.e. the bracket 260 cannot be attached to the panel 204 backwards, reversed, upside down, etc. Therefore, an ECU 265 with a connection slot or plug 267 is oriented correctly as per a design intent. As such, the panel-ECU attachment system affords for the correct placement of a single ECU during manufacture and/or repair of a vehicle.

FIG. 5 also illustrates that puzzle-shaped inner edge for an ECU bracket is not required. For example, the ECU bracket 260 has a straight inner edge 266. In fact, since the distances between the alignment pins and single threaded aperture are unique and do not allow for misplacement or misorientation of an ECU bracket, a second ECU bracket having attached to ECU attachment site 210 could have a straight inner edge, or in the alternative a arcuate shaped inner edge. Furthermore, it is appreciated that each ECU bracket could have more than one ECU attached thereto and the overall triangular shape of the ECU bracket shown in the figures is not required.

Figure 6:
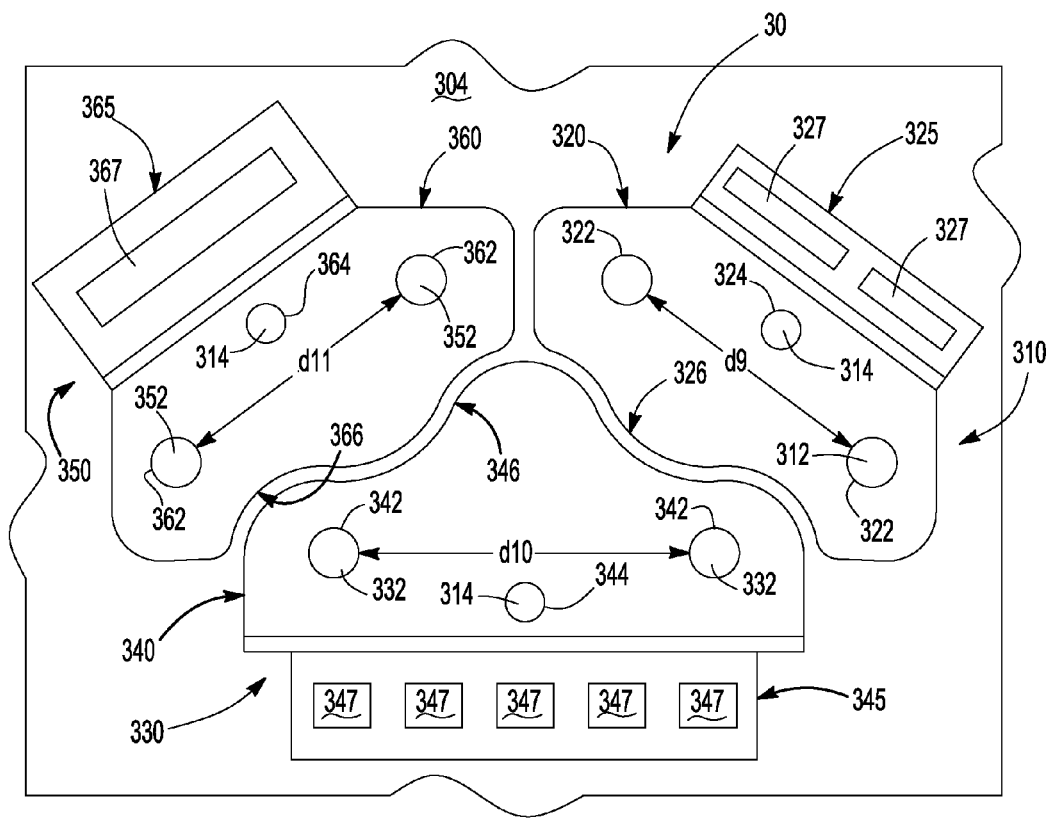
FIG. 6 is a schematic illustration of a three ECU brackets attached to a back side of a panel according to an embodiment disclosed herein.

It is appreciated that although FIGS. 3-5 illustrate only two ECU bracket attachment sites with two ECU attachment brackets, such a limitation is not required. For example, FIG. 6 illustrates another embodiment of an inventive panel-ECU bracket attachment system at reference numeral 30. An embodiment 30 includes a panel 304 that has a first ECU bracket attachment site 310 with a pair of alignment pins 312 spaced apart by a distance d9 and a single threaded aperture 314; a second ECU bracket attachment site 330 with a pair of alignment pins 332 spaced apart by a distance d10 and a single threaded aperture 314; and a third ECU bracket attachment site 350 with a pair of alignment pins 352 spaced apart by a distance d11. Also, the distances d9, d10 and d11 are not equal to each other (d9≠d10≠d11).

The first ECU bracket attachment site 310 also includes a first ECU bracket 320 that has a pair of alignment pin apertures 322 spaced apart from each other by the distance d9 and a single fastener aperture 324. Likewise, the second ECU bracket attachment site 330 has a second ECU bracket 340 with a pair of alignment pin apertures 342 spaced apart from each other by the distance d10 and a fastener aperture 344. Finally, the third ECU bracket attachment site 350 has a third ECU bracket 360 with a pair of alignment pin apertures 362 spaced apart from each other by the distance d11 and a fastener aperture 364.

With the distance between the pair of alignment pin apertures 322 being d9, the distance between the pair of alignment pin apertures 342 being d10, the distance between the pair of alignment pin apertures 362 being d11, and d9≠d10≠d11, the first ECU bracket 320 can only be attached to the panel 304 at the first ECU bracket attachment site 310. Likewise, the second ECU bracket 340 can only be attached to the panel 204 at the second ECU bracket attachment site 330 and the third ECU bracket 360 can only be attached to the panel 204 at the third ECU bracket attachment site 350.

The first, second and third ECU brackets 320, 340, 360 can have an ECU 325, 345 and 365, respectively attached thereto. In addition, the ECUs 325, 345, 365 can have one or more connection slots or plugs, 327, 347, 367, respectively, which are used to connect the ECUs to additional equipment as is known to those skilled in the art. Each of the first, second and third ECU brackets 320, 340, 360 can also have a complementary contoured puzzle-shaped inner edge 326, 346 and 366, respectively. As shown in FIG. 6, the complementary contoured puzzle-shaped inner edges 326, 346 and 366 allow for the first, second and third ECU brackets 320, 340 and 360, respectively, to be fit together like puzzle pieces and thereby ensure that the brackets are properly attached and located with respect to each other, however this is not required. Also shown in FIG. 4, the complementary contoured puzzle-shaped inner edges can extend generally parallel to each other. In some instances, the complementary contoured puzzle-shaped inner edges 326, 346 and 366 are spaced apart from each other not more than 2 centimeters, preferably not more than 1 centimeter, and still more preferably not more than 0.5 centimeters.

It is also appreciated that changes, modifications, and the like can be made to the embodiments disclosed herein and still fall within the scope the invention. As such, the scope of the invention is defined by the claims and all equivalents thereof.

We claim:

1. An instrument panel-ECU bracket attachment system comprising:
   an instrument panel (IP) having a first ECU bracket attachment site and a second ECU bracket attachment site;
   said first ECU bracket attachment site having a first pair of alignment pins, said first pair of alignment pins spaced apart by a first distance therebetween;
   said second ECU bracket attachment site having a second pair of alignment pins, said second pair of alignment pins spaced apart by a second distance therebetween, said second distance not equal to said first distance;
   a first ECU bracket and a second ECU bracket, said first ECU bracket having a first pair of pin apertures spaced apart from each other by said first distance and said second ECU bracket having a second pair of pin apertures spaced apart from each other by said second distance;
   said first ECU bracket attachable to said IP only at said first ECU bracket attachment site and said second ECU bracket attachable to said IP only at said second ECU bracket attachment site.

2. The instrument panel-ECU bracket attachment system of claim 1, wherein said first and second ECU brackets have a first and second IP attachment portion, respectively, said first and second pair of pin apertures within said respective IP attachment portion.

3. The instrument panel-ECU bracket attachment system of claim 2, wherein said first and second IP attachment portions have a first and second generally planar portion, respectively, said first and second generally planar portions having complementary contoured puzzle-shaped inner edges.

4. The instrument panel-ECU bracket attachment system of claim 3, further comprising:
   a first and second threaded fastener, said first and second ECU bracket attachment site having a first and second threaded aperture, respectively, and said first and second planar portions having a first and second fastener aperture, respectively;
   said first and second ECU brackets attached to said IP with said first and second threaded fastener extending through said first and second fastener aperture, respectively, and threadingly engaged with said first and second threaded aperture, respectively.

5. The instrument panel-ECU bracket attachment system of claim 4, wherein said complementary contoured puzzle-shaped inner edges extend generally parallel to each other.

6. The instrument panel-ECU bracket attachment system of claim 5, wherein said complementary contoured puzzle-shaped inner edges are spaced apart from each other not more than 2 cm.

7. The instrument panel-ECU bracket attachment system of claim 6, wherein said complementary contoured puzzle-shaped inner edges are spaced apart from each other not more than 1 cm.

8. The instrument panel-ECU bracket attachment system of claim 7, wherein said complementary contoured puzzle-shaped inner edges are spaced apart from each other not more than 0.5 cm.

9. An instrument panel-ECU bracket attachment system comprising:
- an instrument panel (IP) having a back side, said back side having at least two ECU bracket attachment sites and each ECU bracket site having a pair of ECU bracket alignment pins, each pair of ECU bracket alignment pins spaced apart from each other by a different pin-to-pin distance than every other pair of ECU bracket alignment pins such that each of said at least two ECU bracket attachment site having a unique alignment pin spatial configuration;
- at least two ECU brackets having an ECU attachment portion and an IP attachment portion, each IP attachment portion having a pair of alignment pin apertures spaced apart from each other by different aperture-to-aperture distance than said every other pair of ECU bracket alignment pin apertures such that each of said at least two IP attachment portions having a unique alignment pin aperture spatial configuration that is complementary with one of said alignment pin spatial configurations, said complementing of said unique pin spatial configurations with said unique alignment pin aperture spatial configurations ensuring each of said ECU brackets can be attached to said IP back side at only one of said ECU bracket attachment sites.

10. The instrument panel-ECU bracket attachment system of claim 9, wherein each of said IP attachment portions have a generally planar portion and at least two of said generally planar portions have complementary contoured puzzle-shaped inner edges.

11. The instrument panel-ECU bracket attachment system of claim 10, further comprising:
- at least two threaded fasteners, said at least two ECU bracket attachment sites each having a threaded aperture, and said at least two generally planar portions having a fastener aperture;
- said at least two ECU brackets each attached to said IP back side with said at least two threaded apertures extending through said fastener apertures and threadingly engaged with said threaded apertures in said at least two ECU bracket attachment sites.

12. The instrument panel-ECU bracket attachment system of claim 11, wherein said complementary contoured puzzle-shaped inner edges extend generally parallel to each other.

13. The instrument panel-ECU bracket attachment system of claim 12, wherein said complementary contoured puzzle-shaped inner edges are spaced apart from each other not more than 2 cm.

14. The instrument panel-ECU bracket attachment system of claim 13, wherein said complementary contoured puzzle-shaped inner edges are spaced apart from each other not more than 1 cm.

15. The instrument panel-ECU bracket attachment system of claim 14, wherein said complementary contoured puzzle-shaped inner edges are spaced apart from each other not more than 0.5 cm.

16. A panel-ECU bracket attachment system comprising:
- a panel having a first ECU bracket attachment site and a second ECU bracket attachment site;
- said first ECU bracket attachment site having a first pair of alignment pins, said first pair of alignment pins spaced apart by a first distance therebetween;
- said second ECU bracket attachment site having a second pair of alignment pins, said second pair of alignment pins spaced apart by a second distance therebetween, said second distance not equal to said first distance;
- a first ECU bracket and a second ECU bracket, said first ECU bracket having a first pair of pin apertures spaced apart from each other by said first distance and said second ECU bracket having a second pair of pin apertures spaced apart from each other by said second distance;
- said first ECU bracket attachable to said panel only at said first ECU bracket attachment site and said second ECU bracket attachable to said panel only at said second ECU bracket attachment site.

17. The panel-ECU bracket attachment system of claim 16, wherein said first and second ECU brackets have a first and second panel attachment portion, respectively, said first and second pair of pin apertures within said respective panel attachment portion.

18. The panel-ECU bracket attachment system of claim 17, wherein said first and second panel attachment portions have a first and second generally planar portion, respectively, said first and second generally planar portions having complementary contoured puzzle-shaped inner edges.

19. The panel-ECU bracket attachment system of claim 18, further comprising:
- a first and second threaded fastener, said first and second ECU bracket attachment site having a first and second threaded aperture, respectively, and said first and second planar portions having a first and second fastener aperture, respectively;
- said first and second ECU brackets attached to said IP with said first and second threaded fastener extending through said first and second fastener aperture, respectively, and threadingly engaged with said first and second threaded aperture, respectively.

20. The panel-ECU bracket attachment system of claim 18, wherein said complementary contoured puzzle-shaped inner edges extend generally parallel to each other.

* * * * *